Dec. 11, 1951      J. C. BARRETT      2,577,949
BODY SUPPORTING SEAT
Filed Jan. 9, 1951
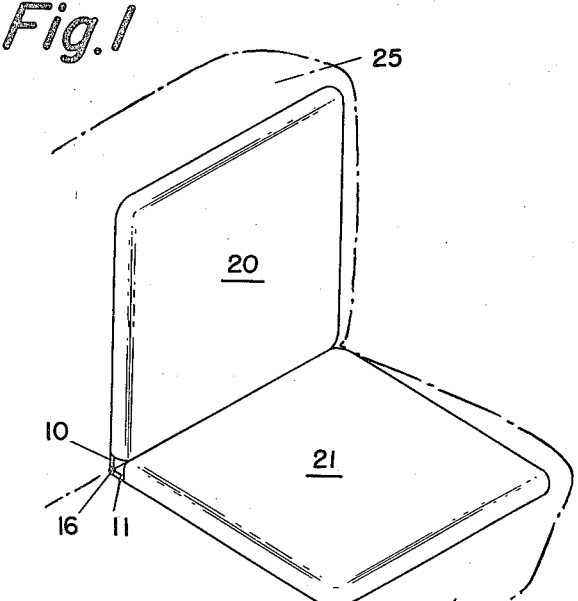
Fig. 1
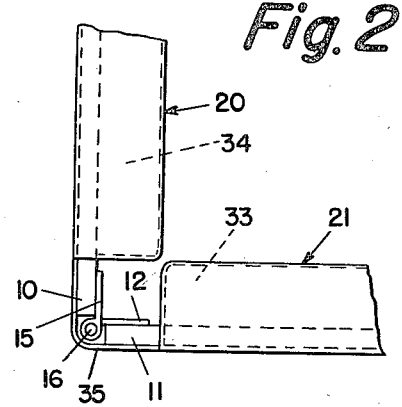
Fig. 2
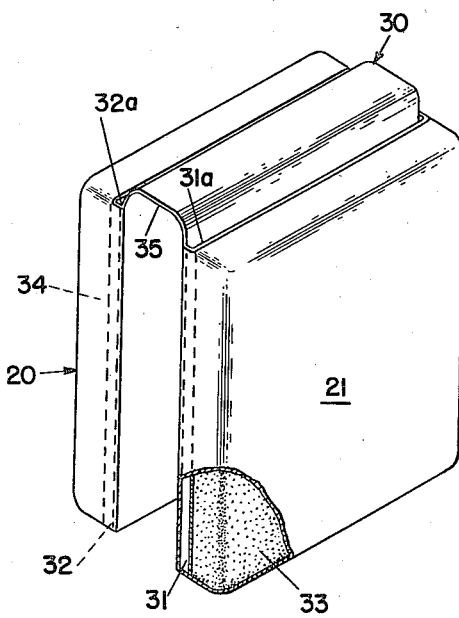
Fig. 4
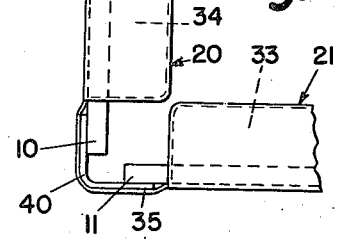
Fig. 3
Fig. 5
INVENTOR.
JOSEPH C. BARRETT
BY *Joseph Rossman*
ATTORNEY

UNITED STATES PATENT OFFICE 2,577,949

BODY SUPPORTING SEAT

Joseph C. Barrett, Philadelphia, Pa.

Application January 9, 1951, Serial No. 205,176

6 Claims. (Cl. 155—182)

This invention relates to an auxiliary body supporting seat adapted to be positioned on an upholstered automobile seat and the like. More specifically, the invention relates to an auxiliary body supporting seat for providing a rigid support for the sitting and back regions of a seated person in order to reduce muscle fatigue and strains, muscular cramps and especially pains and strains in the sacro-iliac and lumbo-sacral region.

Present day automobiles are designed for comfort and all the various appointments therein are concentrated in that direction. From continued usage, the front seat cushion and the adjacent back cushion portion of the front seat occupied by the driver in an automobile have a tendency to weaken. This happens mostly in the area at the back of the seat cushion where the driver normally sits, and at the bottom of the back cushion in back of the driver. The springs in the seat and back cushion tend to weaken and, in some cases, collapse. This condition does not come about suddenly, but is a continuing process, gradually getting worse. When this condition exists, the weakened cushions permit the driver's back to recess into a space provided by the weakened cushions. He thus drives in an unnatural position. Most drivers of an automobile have had the experience of driving for two or three hours without stopping, and, when they finally come to a stop, have some difficulty in straightening up. In every case, this can be traced to either collapsed or weakened springs in the cushions or, in the case of newer cars, driving in a too relaxed posture.

The current trend of our population is toward larger numbers of middle-aged men and women whose muscular systems tend to lose their tone and quick recovery from prolonged fatigue and strains. Consequently, we are now having hundreds of thousands of cases involving pains and aches in the sacro-iliac and lumbo-sacral regions or the lower back portion. These persons get some relief at night by sleeping on rigid bed boards, but during the waking hours while sitting on upholstered chairs or while driving an automobile do not have any available support for their lower back portion. Many persons such as salesmen, truck drivers, and others also have to spend many hours driving their cars and if suffering from sacro-iliac strains have no available relief while driving their cars.

The present invention affords a solution to the above-mentioned difficulties by providing an auxiliary body supporting seat comprising a pair of hinged rigid supporting panels, one of the panels being adapted to provide a rigid seat portion for a seated person and the other panel being adapted to provide a rigid support for the back of the seated person, each of the panels being provided with a cushioned resilient surface of a thickness to provide comfortable seating for prolonged periods of time. Further objects and advantages of the invention will be apparent from the following specification and appended drawings, wherein Figure 1 is a perspective view of an auxiliary body supporting seat made in accordance with the present invention supported on an automobile seat, Figure 2 is an enlarged fragmental end view of the supporting seat shown in Figure 1, Figure 3 is a perspective view of the removable hinged rigid supporting panels used in the supporting seat shown in Figure 1, Figure 4 is a perspective view, partly in section, of the hinged pocket portions for retaining the hinged rigid supporting panels shown in Figure 3, and Figure 5 is an enlarged fragmental end view of a modified flexible hinge construction for the rigid backing panels.

Referring to the drawings, Figure 1 illustrates a conventional automobile seat 25 on which is supported a body supporting seat, constructed in accordance with the present invention, having a rigid back portion 20 and a rigid seat portion 21 for a seated person. Further details of the supporting seat are illustrated in Figures 2 to 4, wherein is shown a holder 30 which is suitably made of flexible material, such as any suitable textile or flexible plastic sheet material, having pocket portions 20 and 21 which are flexibly hinged together by a flexible hinge 35, preferably integral with the pocket portions and coextensive in width.

Each of the pocket portions 20 and 21 is adapted to retain therein a resilient cushion 34 and 33, respectively, made of foam rubber, felt, hair or other suitable cushioning material. The dimensions of the cushions 33 and 34 are such as to provide a space 31 and 32 in each of the pocket portions 21 and 20, respectively, to permit insertion at the respective mouths 32a and 31a of the pocket portions, rigid backing panels 10 and 11, shown in Figure 3. The backing panels may be made of plywood, metal, plastic or other rigid sheet material of suitable dimensions and thickness so as to be received in the spaces 31 and 32 of the pocket portions.

The rigid panels 10 and 11 may be inserted individually or they may be conveniently hinged together as shown in Figure 3 so as to be insertable as a unit in the pocket portions. The panels 10 and 11 may be hinged by metal hinge leaves 12 and 15 which are suitably fastened to the panels as by rivets 14 or other suitable fastening means and connected together by a pintle 16. If desired, the panel members may be hinged together by a flexible hinge 40 as shown in Figure 5 made of flexible material such as leather, textile or plastic sheet material which is suitably affixed to the panel members 10 and 11.

The body supporting seat is assembled by first providing the hinged pocket portions, as shown in Figure 4, having the resilient cushions 33 and 34 of suitable dimensions positioned and retained therein. The hinged panel members 10 and 11 are then inserted through the open mouth portion 31a and 32a. The panel members 10 and 11 are preferably of the same dimensions and coextensive in area with the cushions 33 and 34. The supporting seat is then positioned on an automobile seat or other desired seating surface in the relation shown in Figures 1 and 2. The thickness of the resilient cushions is such as to provide a cushioned resilient surface for the supporting seat so as to be comfortable for a person seated thereon for prolonged periods of time. It will be noted that the hinge leaves 12 and 15 will be covered by the flexible hinge 35 so that the hinge will not catch or snag the fabric of the seat 25. The supporting seat will also remain in proper position at all times and will not slide or move about. The seat 21 and back 20 being freely hinged will also readily adjust themselves to the seat 25 and provide a comfortable seat for the driver at all times.

The auxiliary supporting seat made in accordance with the present invention is portable, light-weight and can be easily folded and removed from an automobile or any other seating surface. It has been found to be very effective in giving adequate support for the lower back regions of seated persons, especially those suffering from pains and strains in the sacro-iliac and lumbo-sacral regions, particularly when they find it necessary to drive an automobile for prolonged periods of time. The present supporting seat helps to relieve undue strains in the lower back regions and thus helps to avoid cramped lower back muscles. My supporting seat is also very useful for use in automobiles driven by men and women of short stature as it will give them an elevated position in the car without requiring any additional pillows to prop them up. They will thus be able to drive in ease and comfort and have complete control at all times, while having better visibility and being relaxed with absence of any driving strain. My supporting seat is also very useful in giving support to the short-statured driver when it is necessary to apply the brakes suddenly by affording rigid resistance not given by conventional pillows usually used as a propping up medium, thereby resulting in more positive brake application.

Although my supporting seat is adapted especially for use in automobiles it can be used elsewhere in homes, offices and theatres on ordinary chairs and other seating surfaces for relieving sacro-iliac strains during sitting position. It can also be used for seating support in beds and on beach and deck chairs.

It is to be understood that the specific examples herein described are merely an illustrative embodiment of my invention and that many modifications and variations may be adopted applying the essential features of my invention. For example, the hinged pocket portions may be dispensed with and instead two hinged supporting panels could be used provided with suitable resilient cushioning surfaces which may be directly affixed to the outer exposed surfaces of the supporting panels by any suitable means or removably attached thereto by any suitable means. It is also to be understood that a great variety of suitable materials may be utilized in making my supporting seat. The supporting seat may also be made of any suitable size and dimensions depending upon the particular use for which it is intended.

I claim:

1. A body supporting seat adapted to be positioned on an upholstered automobile seat and the like comprising two opposed pocket portions, said pocket portions being flexibly hinged, each of said pocket portions retaining therein a rigid supporting panel and a resilient cushion, one of said pocket portions being adapted to provide a rigid seat portion for a seated person and the other pocket portion being adapted to provide a rigid support for the back of the seated person.

2. A body supporting seat adapted to be positioned on an upholstered automobile seat and the like comprising two opposed pocket portions, said pocket portions being flexibly hinged, each of said pocket portions retaining therein a rigid supporting panel of plywood and a resilient cushion of foam rubber, one of said pocket portions being adapted to provide a rigid seat portion for a seated person and the other pocket portion being adapted to provide a rigid support for the back of the seated person.

3. A body supporting seat adapted to be positioned on an upholstered automatic seat and the like comprising a pair of hinged rigid supporting panels, one of said panels being adapted to provide a rigid seat portion for a seated person and the other panel being adapted to provide a rigid support for the back of the seated person, each of said panels being provided with a cushioned resilient surface to provide comfortable seating for prolonged periods of time.

4. A body supported seat adapted to be positioned on an upholstered automobile seat and the like comprising a pair of rigid panels hinged together by a metal hinge, said hinge permitting said panels to be positioned at any desired angle, one of said panels being adapted to provide a rigid seat portion for a seated person and the other panel being adapted to provide a rigid support for the back of the seated person, each of said panels being provided with a resilient cushioned surface to provide comfortable seating for prolonged periods of time.

5. A body supporting seat adapted to be positioned on an upholstered automobile seat and the like comprising a pair of pocket portions made of flexible material, said pocket portions being hinged together adjacent their open mouths by a flexible hinge, each of said pocket portions being provided with a resilient cushion, a rigid backing panel substantially coextensive with the rear face of each of said resilient cushions, one of said pocket portions being adapted to provide a rigid seat for a seated person and the other of said pocket portions being adapted to provide a rigid support for the back of the seated person.

6. A body supporting seat adapted to be positioned on an upholstered automobile seat and the like comprising a pair of pocket portions made of flexible material, said pocket portions being hinged together adjacent their open mouths by a flexible hinge, each of said pocket portions being provided with a resilient cushion, a rigid backing panel substantially coextensive with the rear face of each of said resilient cushions retained in each of said pocket portions, said rigid backing panels being hinged together adjacent the open mouths of said pocket portions and adapted to be removable as a unit therefrom, one of said pocket portions being adapted to provide a rigid seat for a seated person and the other of said pocket portions being adapted to provide a rigid support for the back of the seated person.

JOSEPH C. BARRETT.

REFERENCES CITED

The following references are of record in the file of this patent:

UNITED STATES PATENTS

| Number | Name | Date |
|---|---|---|
| 1,707,913 | Knight | Apr. 2, 1929 |
| 2,475,962 | Horn | July 12, 1949 |